United States Patent [19]

Bauer et al.

[11] Patent Number: 4,765,444

[45] Date of Patent: Aug. 23, 1988

[54] FRICTION DAMPER

[75] Inventors: Fritz Bauer; Hans-Peter Bauer, both of Altdorf; Hans J. Bauer, Röthenbach, all of Fed. Rep. of Germany

[73] Assignee: Fritz Bauer+Söhne OHG, Altdorf, Fed. Rep. of Germany

[21] Appl. No.: 494,680

[22] Filed: May 16, 1983

Related U.S. Application Data

[63] Continuation-in-part of Ser. No. 187,186, Sep. 15, 1980, abandoned.

[30] Foreign Application Priority Data

Oct. 23, 1979 [DE] Fed. Rep. of Germany ....... 2942716

[51] Int. Cl.⁴ .................... F16F 7/08; D01H 7/04
[52] U.S. Cl. .................... 188/129; 188/381; 188/322.22; 267/134
[58] Field of Search ............ 188/381, 83, 129, 130, 188/134, 300, 271, 288, 322.11–322.22, 378–380, 268, 321.11, 264 R; 92/249, 251, 248, 258; 267/120, 64.11, 124, 129, 9 C, 9 B, 9 R, 9 A, 134–136, 140.1, 139–141.7; 74/531; 277/58, 59, 165, 178, 225, 169; 440/61; 248/636

[56] References Cited

U.S. PATENT DOCUMENTS

| 374,080 | 11/1887 | Nickerson | 188/322.22 |
|---|---|---|---|
| 1,120,885 | 12/1914 | Babcock | 188/321.11 |
| 1,458,814 | 6/1923 | Focht | 188/321.11 |
| 1,488,197 | 3/1924 | Demke et al. | 188/129 |
| 1,557,720 | 10/1925 | Mueller | 92/258 X |
| 2,705,634 | 4/1955 | Sampson et al. | 267/9 C |
| 3,121,218 | 2/1964 | Hallinan | 188/129 X |
| 3,155,015 | 11/1964 | Genz | 92/249 |
| 3,355,142 | 11/1967 | Kammeren Jr. et al. | 277/58 X |
| 3,667,222 | 6/1972 | Saari | 277/58 X |
| 3,885,517 | 5/1975 | Borst et al. | 440/61 X |

FOREIGN PATENT DOCUMENTS

| 512550 | 7/1952 | Belgium | 92/258 |
|---|---|---|---|
| 739989 | 10/1943 | Fed. Rep. of Germany | 267/64.11 |
| 1012494 | 7/1957 | Fed. Rep. of Germany | 188/271 |
| 1147806 | 4/1963 | Fed. Rep. of Germany | 188/271 |
| 1680642 | 1/1970 | Fed. Rep. of Germany | 188/271 |
| 1950794 | 4/1971 | Fed. Rep. of Germany | . |
| 2019134 | 11/1971 | Fed. Rep. of Germany | 188/129 |
| 1523497 | 9/1978 | Fed. Rep. of Germany | . |
| 1488878 | 6/1967 | France | 188/271 |
| 709080 | 5/1954 | United Kingdom | 188/129 |

*Primary Examiner*—Douglas C. Butler
*Attorney, Agent, or Firm*—Browdy and Neimark

[57] ABSTRACT

A frictional damper, includes a circular-cylindrical casing and a ram which is coaxially displaceable in the casing and the inner end of which is provided with a cylindrical friction piston. On its external face, the friction piston is provided with one or more friction elements which are elastically pressed against the inner wall of the casing. To obtain a uniform surface pressure over the entire friction surface of the friction element or elements during the entire life of the frictional damper, the friction piston is provided with a bushing having a circular-cylindrical external shape and of counter-holder flanges or disks which project radially from the bushing and delimit the latter at a fixed axial extent. Moreover, at least one annular-cylindrical friction sleeve which has a closed circumference, is made of an elastically yielding material and is under tension in its inner circumferential zone, is provided on the bushing. The damper is particularly useful for damping washing machines which have a spinning mode.

11 Claims, 2 Drawing Sheets

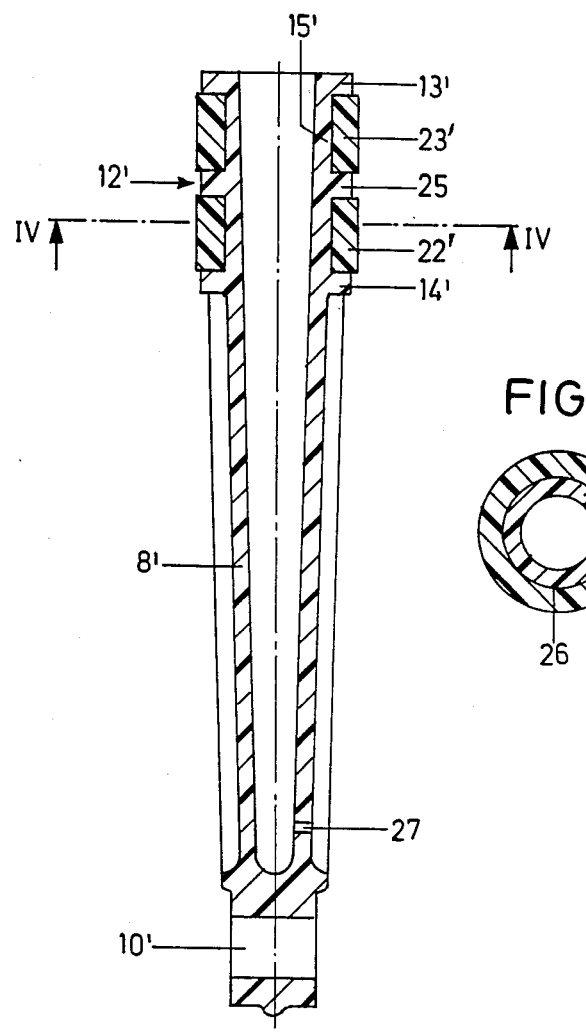
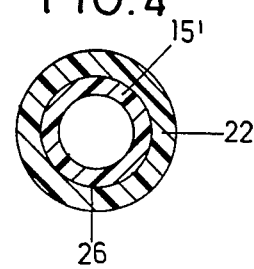

FRICTION DAMPER

This application is a continuation-in-part of application Ser. No. 187,186, filed Sept. 15, 1980, now abandoned.

BACKGROUND OF THE INVENTION

This invention relates to a frictional damper, especially useful in washing machines with a spinning mode, which has a circular-cylindrical casing and a ram which is coaxially displaceable in the casing and one end of which projects from the casing and the other end of which is provided with an approximately cylindrical friction piston. The invention relates, more particular to such a frictional damper in which the piston is provided on one external face with one or more friction elements which are elastically pressed against the inner wall of the casing.

In a frictional damper of the above-mentioned type, known from British Patent Specification No. 1,523,497, the friction piston consists of at least three elements which are formed from cylinder sections provided on their external face with friction elements. These cylinder sections are provided on their external face with recesses in which friction elements of felt are located. On their inside, the cylinder sections are radially under the load of an annular spring. In the case of wear of the friction elements, this design makes so-called wear readjustment possible. However, because the cylinder sections have an exactly circular outline only if they are arranged on a well-defined circular arc, there is no guarantee that, over the full life of such a frictional damper, the specific surface pressure of the friction elements against the associated inner wall of the casing is or remains equal at all points of the friction elements. This also has the undesirable consequence that the friction characteristics of such a frictional damper vary over its life time.

From the German Federal Repulic Offenlegungsschrift (Laid Open Patent Application) No. 1,950,794, a frictional damper is known, the friction piston of which includes an outer friction element, formed from a strip folded together to give an annular cylinder, and of an inner annular body of an elastically yielding material which is compressibly arranged between two annular discs. The outer friction element is glued onto the inner annular body. To balance wear and to set a desired frictional force, the inner annular body can be pretensioned. This design necessarily results in a cambered shape of the friction piston, that is to say, also in this case, the specific surface pressure between the surface of the friction element and the associated inner wall of the casing is not equal over the entire surface of the friction element.

SUMMARY OF THE INVENTION

It is an object of the invention to provide a frictional damper of the generic type which effects a uniform surface pressure over the entire frictional surface of the friction element or elements.

It is a further object of the present invention to provide a friction damper which effects a uniform surface pressure over the entire friction surface and preserves the same for the full life of the frictional damper.

The foregoing objects, as well as others which are to become apparent from the text below, are achieved by providing a frictional damper with a friction piston having a bushing with a circular-cylindrical external shape and counter-holder flanges, which may be disks, and which project radially from this bushing and delimit the latter to a fixed axial extent. The friction element or elements is at least one annular-cylindrical friction sleeve, which has a closed circumference, is made of an elastically yielding material, is under tension in its inner circumferential zone and is provided on the bushing.

Since the friction element or elements are formed as an annular-cylindrical sleeve and are pre-tensioned over their entire internal surface, their pre-tension and hence also their surface pressure against the inner wall by of the casing is completely uniform over the entire external surface. This state is also preserved over the entire life of the frictional damper. The pretension of the friction sleeve in the zone of its internal circumference ensures that the friction sleeve is always under tension even in the zone of its external circumference, that is to say in the zone of its friction surface, and this has the consequence that it is impossible for waviness to be established in the external friction surface, which waviness would indeed entail non-uniform friction conditions, distributed over the surface. On the one hand, because the bushing receiving the friction sleeve, of which there is at least one, is firmly clamped in between two counter-holder flanges and becase on the other hand, the friction sleeves themselves are firmly held on the bushing under pre-tension, that is to say positively, there are not rattling noises whatsoever due to play, necessary for constructional reasons, between the various parts.

The friction sleeve or sleeves are preferably pretensioned on the inner circumference in the range of from 5% to 15%. This degree of deformation, by which the friction sleeve of which there is at least one, should be preferrably deformed radially outwards in the zone of its internal circumference in order to provide optimum contact pressure conditions in its external zone against the inner wall of the casing of the friction damper.

The external diameter of the friction sleeve or sleeves of which there is at least one, is approximately equal to the internal diameter of the casing. This assures that the sleeve or sleeves are under tension only in their inner zones.

The diameter of the counter-holder flanges desireably approximately corresponds to the internal diameter of the casing thereby assuring that pre-tensioned friction sleeve or sleeves cannot move away axially from the friction piston, but that, in fact, the counter-holder flanges, which may be disks, and the bushing delimit a space which is exactly defined in volume terms and in which the friction sleeve or friction sleeves can expand up to the inner wall of the casing only in the case of corresponding wear.

The friction sleeve or sleeves are preferably made of a foamed polyurethane plastic with closed cells.

The friction piston and the ram are desireably formed integrally. The friction piston and ram can be made of a plastic which can be injection-moulded.

The friction damper can be provided with at least two friction sleeves, a counter-holder flange being formed on the bushing between the two adjacent friction sleeves.

BRIEF DESCRIPTION OF THE DRAWING

Further advantages and features of the invention can be seen from the description of illustrative embodiments, reference being made to the accompanying drawing in which:

FIG. 3 shows a ram with a friction piston which can be used in place of the ram and friction piston of FIG. 1 to provide a second embodiment of the present invention; and FIG. 4 is a cross-section of FIG. 3 along line IV—IV of FIG. 3.

DETAILED DESCRIPTION OF THE PREFERRED EMBODIMENTS

Figure 1:
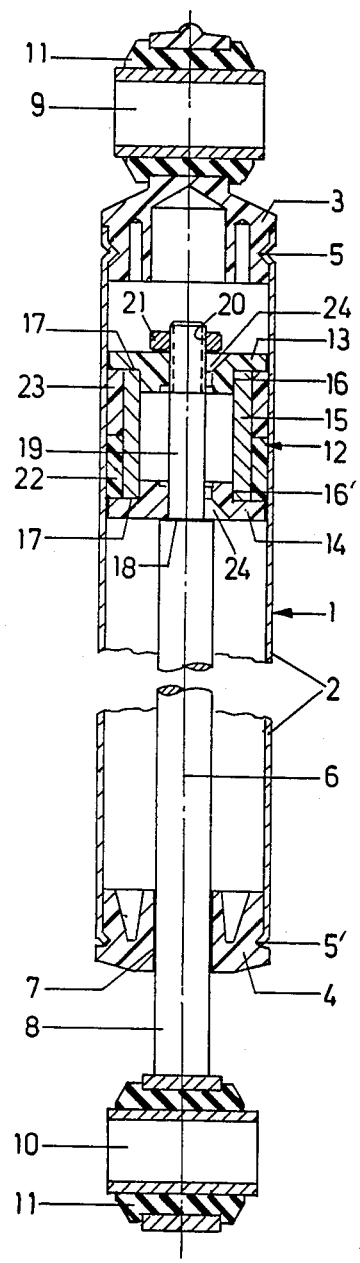
FIG. 1 shows a longitudinal section of a first embodiment of a frictional damper according to the present invention.

The frictional damper shown in the drawing has a casing 1 which consists of a circular-cylindrical tube 2 which is closed at one end by means of a bottom 3, whilst it is substantially closed at the other end by a guide bushing 4. In the external circumference of the bottom 3 and of the guide bushing 4, annular groove 5 and 5' are respectively provided, the tube 2 being rolled appropriately into the annular groove, so that the bottom 3 and the guide bushing 4 are axially fixed relative to the tube 2. In the guide bushing 4, a guide bore 7 is formed which is coaxial to the longitudinal axis 6 of the casing 1 and in which a ram 8 is guided, which consists of a solid rod of circular-cylindrical cross-section, as shown in FIG. 1.

At the outer end of the ram 8 and at the bottom so-called eyes 10,9 are respectively fixed in each case in the customary manner, by means of which eyes the frictional damper can be hinged between two parts which can move relative to one another and the relative movement of which is to be damped. The eyes 9, 10 are provided in the customary manner with resilient damping inserts 11, for example rubber inserts.

A friction piston 12 which has two counter-holder disks 13, 14 and an annular-cylindrical basing 15, is fitted to the inner end of the ram 8, located within the casing 1. This bushing 15 is radially fixed between corresponding annular collars 16 and 16', respectively, of the counter-holder disks 13, 14 and bears axially against corresponding abutment surfaces 17 and the counter-holder discs 13 and 14.

The counter-holder disc 14 facing the eye 10 bears against an abutment collar 18 of the ram 8, that is to say that the friction piston 12 as a whole is pushed over a journal-like extension 19 which extends from the collar 18 up to the adjacent end of the ram 8. The end of the extension 19 is provided with a thread 20; a self-locking nut 21, screwed onto the thread 20, holds the described parts of the friction piston 12 firmly together.

Two friction sleeves 22, 23 formed with a closed circumference are located on the bushing 15, axially one behind the other. The friction sleeves 22, 23 are made of an elastic foamed material with closed cells and with good frictional properties against metal, in particular steel, of which the tube 2 is made. Foamed polyurethane, in particular polyurethane foamed to give closed cells, and which also possesses adequate elasticity, has proved particularly suitable as a friction material of this type.

As can be seen from the drawing, the external diameter D' of the friction sleeves 22 or 23 in the no-load state, that is to say in the state in which they are not drawn over the bushing 15, is approximately equal to the internal diameter D of the tube 2. By contrast, the internal diameter d' of the friction sleeves 22 and 23 in the no-load state is markedly smaller than the external diameter d of the bushing 15. This is approximately $d' = (0.8 - 0.95)d$.

Approximately the following relationship applies to the ratio of the diameters d and D: $d = (0.7$ to $0.9)D$.

The equation $b = (0.05$ to $0.15)D$ then applies to the radial thickness of the friction sleeves 22 and 23 in the state in which they are drawn over the bushing 15 and introduced into the tube 2. It follows from the above dimensional data that, when drawn onto the bushing 15, the friction sleeves 22, 23 are expanded essentially on their inside, whilst their diameter D' in the untensioned state approximately corresponds to the diameter D in the state in which they have been introduced into the tube 2. Due to this pre-tension in the internal zone of the friction sleeves 22, 23, wear is continually balanced in the radial direction, and in particular fully uniformly over the entire cylindrical friction surface of the friction piston 12.

To prevent the friction sleeves 22, 23 from moving axially away, the counter-holder discs 13, 14 extend up to the inner wall of the tube 2, merely preserving the play necessary for constructional reasons. Their diameter is thus almost exactly equal to the internal diameter D of the tube 2. There is no axial distortion of the friction sleeves 22, 23. Of course, here also—as is generally customary—a suitable lubricant is applied to the surface of the friction sleeves 22, 23, in order to prevent the friction forces from becoming excessive.

It is to be noted that, because of the diameter ratios which have been described alone, the friction sleeves 22, 23 are elastically extended by from about 5 to about 15% at their internal circumference.

Through-flow orifices 24 are formed in the counter-holder flanges 13, 14, in order to make possible a free flow of air from one side of the friction piston 12 to the other side thereof and vice versa during movements of the ram 8, so that there is no pumping effect.

The frictional damper described above is intended particularly for use in washing machines provided with a spinning mode, wherein very considerable vibrational amplitudes which have to be damped occur, particularly when passing the so-called critical speed of rotation.

Figure 2:
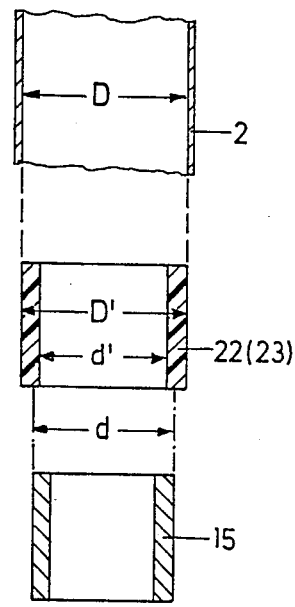
FIG. 2 shows a part of the friction piston and of the inner wall of the casing of the frictional damper according to FIG. 1 in the dismantled state and in an exploded view.

In the design shown in FIGS. 1 and 2, it is of course also possible to provide only one friction sleeve of appropriate length in place of the two sleeves 22, 23. Furthermore, the bushing 15 and the two counter-holder disks 13, 14 as a whole can also be formed integrally, the disks being flanges in that case. This part can, for example, by injection-moulded integrally from plastic.

A further particularly advantageous embodiment is also shown in FIG. 3, where the ram 8' together with the friction piston 12' and the eye 10' is injection-moulded integrally from a suitable plastic. In this case also the friction piston 12' has a bushing 15' which is formed continuously with the likewise tubular ram 8'. Annular counter-holder flanges 13', 14' are formed integrally on this bushing. If, as in the illustrative embodiment according to FIG. 3, the two friction sleeves 22', 23' are provided, it can be advantageous also to fit a likewise annular counter-holder flange 25 between the two friction sleeves 22', 23'. The overall sizing of the friction sleve or friction sleeves 22', 23' relative to the friction piston 12' is the same as in the illustrative embodiment according to FIGS. 1 and 2, so that reference can be made to the corresponding statements. As in the other illustrated embodiment an air inflow-outflow orifice 27 is provided through which air is permitted to flow as the ram 8' moves relative to the circular-cylindrical tube 2 of the casing 1.

As shown in FIG. 4, the friction sleeves 22', 23' can also be fabricated with slits, i.e. they can be formed into the desired annular shape from a flat piece of friction material. In this case, the abutting ends of such flat piece are connected with each other by means of an adhesive layer 26.

In addition, as already indicated above, the air inflowoutflow orifice 27 is provided in the hollowly formed ram 8', through which air is permitted to flow in or out as the ram 8' moves relative to the circular-cylindrical tube 2 of the casing 1. By means of this air inflow-outflow orifice 27, a compression of the air contained inside the ram 8' and the casing 1 during the inward stroke of the piston 8' into the casing 1 is prevented, thereby preventing the build-up of undesirable heating of the friction layers which heating would inevitably occur if the orifice 27 were not present, because the compressions which would occur would inherently create undesirable heating.

It is to be appreciated that the foregoing description and accompanying illustrations relate to embodiments set out by way of example not by way of limitation. Numerous other embodiments and variants are possibly without departing from the spirit and scope of the invention its scope being defined by the appended claims.

What is claimed is:

1. In a frictional damper which includes a circular cylindrical casing with an inner wall and a ram which is coaxially displaceable in the casing and has one end which projects from the casing and another end which is provided with a substantially cylindrical friction piston, the friction piston being provided on one external face with friction means elastically pressed against the inner wall of the casing, the improvement wherein
said friction piston is intergrally formed of plastic with said ram, and comprises a bushing having a substantially circular-cylindrical external shape and counter-holder flanges which project radially from said bushings and delimit the latter to a fixed axial extent, and wherein said friction means comprises at least one friction element constituting a substantially annular-cylindrical friction sleeve made of an elastically yielding closed cell polyurethane foam material, and held under substantial uniform radially directed tension against its inner circumferential zone by said bushing on which said sleeve lies, the inner diameter of said friction sleeve in the untensioned state being smaller than the external diameter of said bushing,
said at least one friction sleeve being pretensioned on its inner circumference against said bushing by from about 5% to about 15%,
wherein damping is achieved substantially solely by means of friction generated between the inner wall of said casing and said at least one friction sleeve.

2. An improved frictional damper according to claim 1, wherein said at least one friction sleeve has an external diameter (D') which is substantially equal to said internal diameter (D) of said casing.

3. An improved frictional damper according to claim 2, wherein said counter-holder flanges have diameters corresponding to said internal diameter (D) of said casing.

4. An improved frictional damper according to claim 2, wherein said damper further includes a third counter-holder flange formed on said bushing axially between two adjacent ones of said friction sleeves.

5. An improved frictional damper according to claims 1, wherein said counter-holder flanges have diameters corresponding to said internal diameter (D) of said casing.

6. An improved frictional damper according to claim 1, wherein said integral plastic friction piston and ram are injection-molded.

7. A frictional damper according to claim 1 wherein said annular-cylindrical friction sleeve has a closed circumference.

8. The improvement of claim 1 wherein
said at least one friction element comprises a pair of said friction elements.

9. The improvement of claim 1 wherein
said friction sleeve includes a separation lying along a line disposed substantially parallel to the longitudinal axis of said damper.

10. The improvement of claim 9 wherein
the ends of said sleeve abut and are connected to each other by means of an adhesive layer.

11. In a frictional damper which includes a circular cylindrical casing with an inner wall and a ram which is coaxially displaceable in the casing and has one end which projects from the casing and another end which is provided with a substantially cylindrical friction piston, the friction piston being provided on one external face with friction means elastically pressed against the inner wall of the casing, the improvement wherein
said friction piston is intergrally formed of plsatic with said ram, and comprises a bushing having a substantially circular-cylindrical external shape and counter-holder flanges which project radially from said bushing and delimit the latter to a fixed axial extent, and wherein said friction means comprises at least one friction element defining means for applying constant frictional force against said casing inner wall, and comprising a substantially annular-cylindrical friction sleeve made of an elastically yielding closed cell polyurethane foam material, and held under substantial uniform radially directed tension against its inner circumferential zone by said bushing on which said sleeve lies, the inner diameter of said friction sleeve in the untensioned state being smaller than the external diameter of said bushing, and
flow-through orifice means communicating one side of said piston with the opposite side thereof,
said at least one friction sleeve being pretensioned on its inner circumference against said bushing by from about 5% to about 15%,
whereby when said ram moves within said casing said orifice means facilitates a free flow of fluid in the casing from one side of the friction piston to the other, and vice-versa, and damping is achieved substantially solely by means of friction generated between said casing wall and said friction generating means.

* * * * *